Dec. 26, 1922.  
G. A. RENAULT.  
CHAIN ESPECIALLY DESIGNED FOR JEWELRY.  
FILED MAY 27, 1919.  
1,439,978.
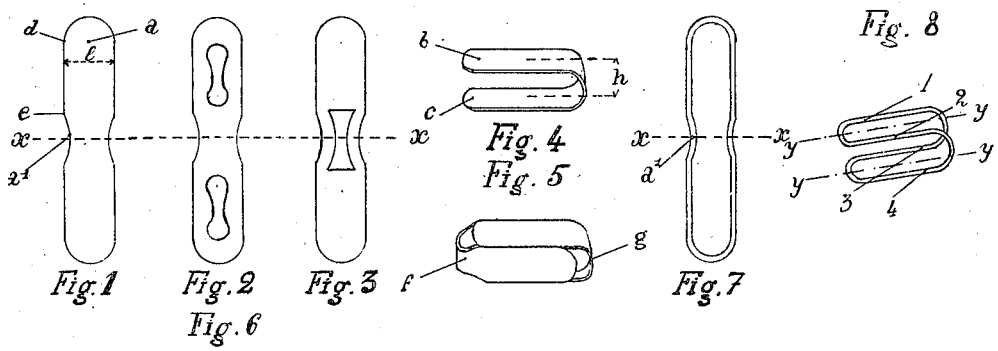
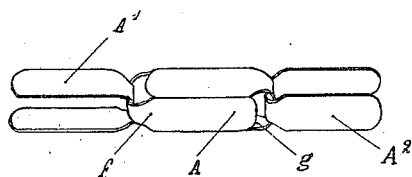
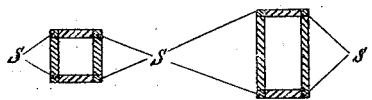
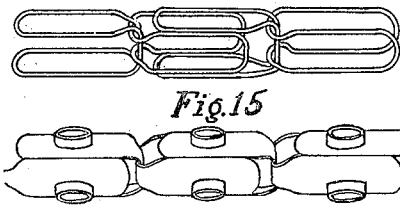
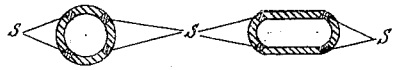
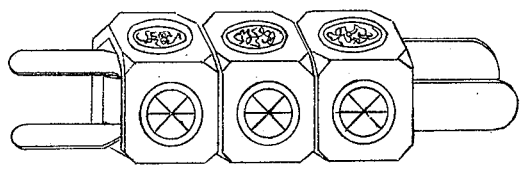
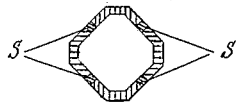
Inventor:  
Gustave Antoine Renault  
per Attorney
Witnesses:

Patented Dec. 26, 1922.

1,439,978

UNITED STATES PATENT OFFICE.

GUSTAVE ANTOINE RENAULT, OF PARIS, FRANCE.

CHAIN ESPECIALLY DESIGNED FOR JEWELRY.

Application filed May 27, 1919. Serial No. 300,202.

*To all whom it may concern:*

Be it known that I, GUSTAVE ANTOINE RENAULT, maker, a citizen of the French Republic, residing at Paris, 37 Rue Reaumur, in Republic of France, have invented certain new and useful Improvements in Chains Especially Designed for Jewelry; and I do hereby declare the following to be a full, clear, and exact description of the invention, such as will enable others skilled in the art to which it appertains to make and use the same.

This invention relates to chains particularly applicable to jewelry, and certain preferred forms of the invention are shown in the accompanying drawings wherein Figures 1, 2 and 3 are outline views of certain forms of the constitutive elements of the improved chain, Figure 4 is a perspective view of one element as bent ready for assembling, Figure 5 is a similar view of an entire unit or link composed of two assembled elements, Figure 6 is a similar view of a part of a chain made of said links, Figure 7 is an outline view of a modified form of element using wire instead of flat metal plate, Figure 8 is a perspective view of one of these elements bent for assembling, Figure 9 is a similar view of a part of a chain made of these wire elements, Figures 10 to 14 are cross sectional views of various modified forms of chain units or links, Figure 15 is a view similar to Figure 6, but showing the links provided with jewel-setting or securing means, and Figure 16 is a similar view of a part of a chain supporting ornamental features.

In preparing the first form of link shown, there is prepared a small plate $a$, of metal or other suitable material, which is oblong in form with rounded ends and is reduced in width near the middle as shown at $a'$. This plate may be stamped or otherwise prepared, and it may have openings of any desired design as shown in Figures 2 and 3.

The elements which form the links are made from these plates by being bent symmetrically on the line $x$—$x$ until the form shown in Figure 4 is produced, wherein the two ends of the plate form parallel blades, $b$ and $c$, preferably about the same distance apart ($h$) as the width of the plate.

Each box link is then made by bringing two elements of this kind into juxtaposition in the manner shown in Figure 5, with parallel edges of contact (from $d$ to $e$) soldered or welded together. The elements are so placed as to leave their curved or rounded bases of reduced width projecting at each end, and in forming the chain of these box links or units, the curved projecting part of one link is threaded through the similar part of the next link. The curved ends are shown at $f$ and $g$, and the mode of assembling the links is shown at $A'$, $A$ and $A^2$ in Figure 6.

As shown in Figures 7 and 8, the plates $a$ may be replaced by wire conforming to the outlines of such plates, and the corresponding element is shown in Figure 8, where the curved base is at $y$, and the two parallel blades are replaced by the parallel sections of wire 1, 2 and 3, 4. In Figure 9 is shown one possible arrangement in a chain of the link elements last described.

It will be seen that whether plates are used, as in Figures 1 to 6, or wires as in Figures 7 to 9, my chain is formed by producing U-shaped links with parallel sides—joining them in couples so that they interlock flexibly—and then joining the couples by bringing the parallel sides of one link into the spaces between the edges of the parallel sides in another link. The word "strips" will be used in the claims to indicate either wires or plates as these are shown to be equivalents.

As shown in Figures 10 and 11, the cross section of a box link as made from plates may be square, as in Figure 10 or, where the widths of the plates brought together are unequal, this section will be oblong, as in Figure 11. The solder at the joints is shown at $s$. By bending the plates of each element transversely, the different shapes shown in cross section in Figures 12 to 14 may be produced. As shown in Figure 15, the outer faces of the links may be provided with setting rings or the like which are fixed to said plates. These may be used for securing jewels.

In Figure 16 is shown part of a chain in which the ornamentations on the successive links take the form of ornamented casings, surrounding the links which support them.

What I claim is—

1. A chain particularly applicable for personal wear composed of successive pairs of links, each pair being composed of two interlocking strips of metal bent to form a U-shape, with parallel sides, said pairs being joined by bringing adjacent links together so that the sides of one link occupy the spaces between the edges of the next.

2. A chain of the character set forth in claim 1 wherein the bent strips are formed of metal plates, thereby forming box links between the flexible joints.

3. A chain of the character set forth in claim 1 in which the strips take the form of bent plates provided with means for securing gems or other ornamentation.

In testimony whereof I affix my signature in presence of two witnesses.

GUSTAVE ANTOINE RENAULT.

Witnesses:
　EDM. LASKY,
　JOHN F. SIMONS.